United States Patent [19]

Eller et al.

[11] Patent Number: 5,287,417
[45] Date of Patent: Feb. 15, 1994

[54] METHOD AND SYSTEM FOR RECOGNIZING A GRAPHIC OBJECT'S SHAPE, LINE STYLE, AND FILL PATTERN IN A PEN ENVIRONMENT

[75] Inventors: Marlin Eller, Seattle; Christopher Leyerle, Issaquah; Shishir P. Pardikar, Redmond, all of Wash.

[73] Assignee: Microsoft Corporation, Redmond, Wash.

[21] Appl. No.: 942,952

[22] Filed: Sep. 10, 1992

[51] Int. Cl.$^5$ .............................................. G06K 9/36
[52] U.S. Cl. ............................... 382/41; 382/9; 382/22; 382/44; 295/133; 295/137
[58] Field of Search ................ 382/41, 49, 45, 46, 382/47, 9, 22; 340/727, 731; 395/100, 118, 133, 137–139, 143

[56] References Cited

U.S. PATENT DOCUMENTS

| | | | |
|---|---|---|---|
| 4,790,028 | 12/1988 | Ramage | 382/44 |
| 4,829,446 | 5/1989 | Draney | 382/44 |
| 5,119,439 | 6/1992 | Osawa et al. | 382/22 |
| 5,175,808 | 12/1992 | Sayre | 382/44 |

*Primary Examiner*—Joseph Mancuso
*Attorney, Agent, or Firm*—Seed and Berry

[57] ABSTRACT

A method and system for recognizing a graphic object's shape, line style, and fill pattern in a pen environment are provided. In a preferred embodiment, a user draws a graphic object on an electronic tablet of a computer system. The graphic object comprises a shape attribute, a line style attribute, and a fill pattern attribute. A Recognizer, provided by the present invention, recognizes the graphic object drawn by the user. The graphic object drawn by the user is made up of a plurality of data points, each data point having an x-coordinate and a y-coordinate. The Recognizer subdivides the plurality of data points into one or more strokes, each stroke representative of a path travelled by the handwriting instrument after the handwriting instrument touches the electronic tablet and before the handwriting instrument is lifted off of the electronic tablet. For each data point in each stroke, the recognizer maps the data point to a normalized data point, then transforms the normalized data point into a transformed data point, and then determines whether the transformed data point is a shape-defining data point or an interior-defining data point. Shape-defining data points are representative of the shape attribute and the line style attribute, while the interior-defining data points are representative of the fill pattern attribute. Based on the coordinates of the transformed data points and the coordinates of the data points input by the user, the recognizer determines the attributes. After determining what the attributes of the graphic object are, the recognizer selects a representation of the graphic object that corresponds to the determined attributes and displays the selected representation on the electronic tablet.

20 Claims, 12 Drawing Sheets

METHOD AND SYSTEM FOR RECOGNIZING A GRAPHIC OBJECT'S SHAPE, LINE STYLE, AND FILL PATTERN IN A PEN ENVIRONMENT

TECHNICAL FIELD

This invention relates generally to the data entry of graphic objects in a pen environment and particularly to the recognition of a graphic shape drawn with a line style and fill pattern.

BACKGROUND OF THE INVENTION

Handwriting recognition systems allow users to input handwritten data into a computer. The user writes data on an electronic tablet with a special pen, and as the user moves the pen across the tablet, the tablet displays lines corresponding to the path travelled by the pen. These lines appear as they are written until the pen is lifted from the tablet. After a predetermined time period, the handwritten lines are recognized as letters, symbols, numbers, or graphical shapes.

Handwriting recognition systems use algorithms to map handwritten data to recognizable symbols. Typically, these systems store a prototype for each symbol that can be recognized. A prototype is a "picture" of a handwritten symbol. Recognition systems use recognition algorithms to map handwritten data to a prototype. When recognizing graphic objects, prior art systems use prototypes such as squares, rectangles, circles, ovals, etc. These prototypes all have a solid line style and a transparent fill pattern, i.e., they are hollow shapes. A user is not able to draw a shape and specify a format, e.g., a line style or fill pattern, for that shape at the same time. For example, when a user desires to input a shape with a line style other than solid, prior art systems require the user to go through a two-step process. The user must first draw the shape, and then, after the shape is recognized by the system, select a desired line style from a palette, menu, or dialog, or type some accelerator key sequence. Similar steps are required to input a shape with a fill pattern other than transparent.

One of the difficulties encountered when a shape and a fill pattern are drawn at the same time is being able to distinguish what lines make up the object and what lines make up the fill pattern.

SUMMARY OF THE INVENTION

It is accordingly an objective of the present invention to provide an improved graphical data entry system for a pen environment.

Another objective is to provide a graphical data entry system which allows a user to input a graphic object with a line style by drawing that object with that line style.

Another objective is to provide a system of the type described in which a user may input a graphic object with a fill pattern by drawing that object with that fill pattern.

These and other objects, which will become apparent as the invention is more fully described below, are obtained by a method and system for recognizing a graphic object's shape, line style, and fill pattern in a pen environment. In a preferred embodiment, a user inputs data points by drawing a graphic object on an electronic tablet of a computer system. The graphic object comprises a shape attribute, a line style attribute, and a fill pattern attribute. A Recognizer, provided by the present invention, recognizes the graphic object drawn by the user. The graphic object drawn by the user is made up of a plurality of data points, each data point having an x-coordinate and a y-coordinate. For each data point input by the user, the recognizer maps the data point to a normalized data point, then transforms the normalized data point into a transformed data point, and then determines whether the transformed data point is a shape-defining data point or an interior-defining data point. Shape-defining data points are representative of the shape attribute and the line style attribute, while the interior-defining data points are representative of the fill pattern attribute. Based on the coordinates of the transformed data points and the coordinates of the data points input by the user, the recognizer determines the attributes. After determining what the attributes of the graphic object are, for example, an oval with a dashed line style and a transparent fill pattern, the recognizer selects a representation of the graphic object that corresponds to the determined attributes and displays the selected representation on the electronic tablet.

DETAILED DESCRIPTION OF THE INVENTION

Figure 1:
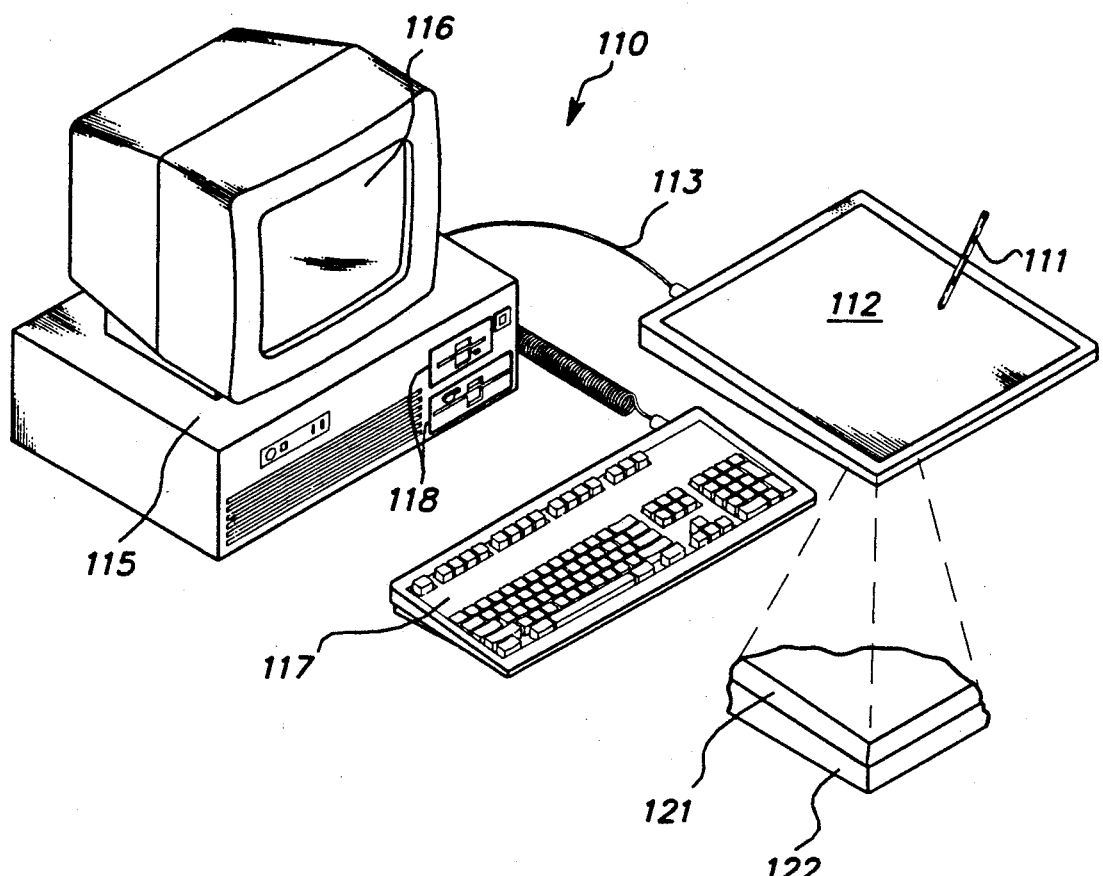
FIG. 1 is an illustration of a computer system using an electronic tablet configured to implement the methods of this invention.

FIG. 1 is an illustration of a computer system 110 configured to implement the methods of this invention. An electronic digitizing tablet 112 is connected to a computer 115 by a cable 113. The computer system also has a conventional display 116, keyboard 117, and disk drives 118. A writing instrument, such as a pen 111, is provided for a user to record graphic objects onto the tablet 112. The tablet 112 comprises an input grid 121 and a display surface 122. The input grid 121 detects contact of the pen 111 with the tablet 112. If contact is detected, then the tablet 112 sends the coordinates of the contact point to the computer 115 through the connecting cable 113. The tablet 112 periodically samples the input grid 121.

Upon receiving the coordinates of the contact point from the tablet 112, the computer 115 "inks" the contact point; that is, the computer 115 sends data to the tablet 112 to turn on a point on the display surface 122 that corresponds to the contact point. The display surface 122 is a standard bitmap display. To a user it looks as if the pen writes the point onto the tablet 112 where the pen 111 made contact. With an appropriate sampling rate, the computer 115 inks multiple contact points as the user moves the pen 111 across the tablet 112 to display lines corresponding to the path travelled by the pen 111. Thus, the computer system allows the user to write data onto the tablet 112.

The tablet 112 may be any suitable digitizing tablet available on the open market which outputs the coordinates of the pen 111 in contact with the tablet 112. Alternatively, the pen 111 may be electrically coupled to the tablet 112 or the computer 115 for providing pen up and down positions based on the tip of the writing instrument being depressed, such writing instruments being well known in the art. In one embodiment, the computer is a standard personal computer available on the open market. Other computer system configurations, however, are acceptable to implement the methods of the present invention. For example, the entire system can be incorporated in a tablet shaped device. The tablet surface is the input grid and display surface. The tablet shaped device contains the logical equivalent of the computer 115 without the display 116, keyboard 117, or disk drives 118.

The methods of the present invention allow the user to input graphic objects into a computer program. Although the methods are described as implemented with the Pen Windows system manufactured by Microsoft Corporation of Redmond, Washington, one skilled in the art would recognize that the methods can be implemented on other windowing and non-windowing systems.

Figure 2A:
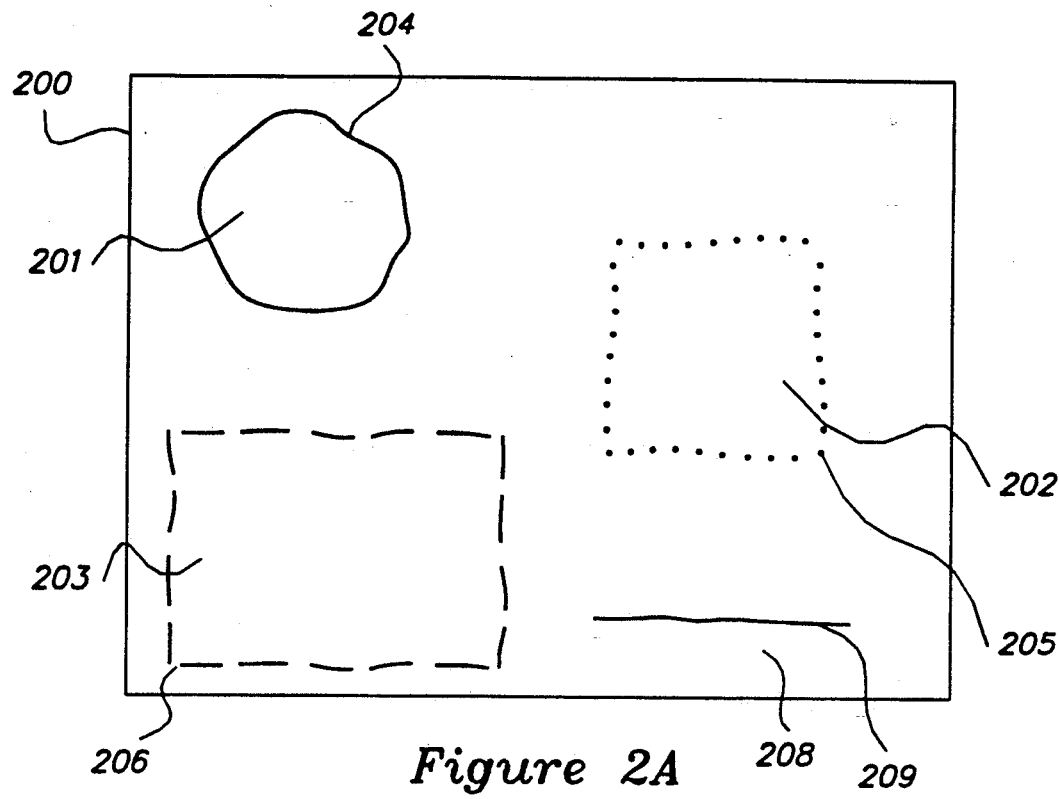
FIG. 2A is an illustration of the electronic tablet of FIG. 1 after the user has handwritten a circle with a solid line style, a square with a dotted line style, and a rectangle with a dashed line style.
Figure 2B:
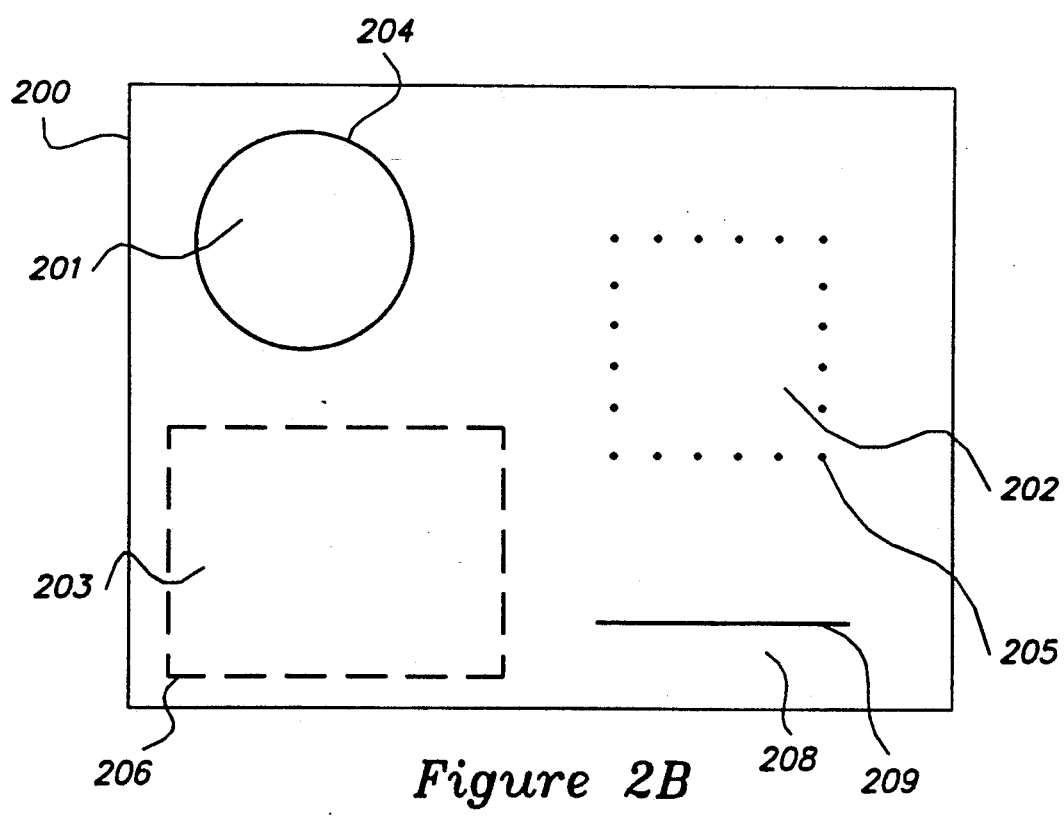
FIG. 2B is an illustration of the electronic tablet of FIG. 1 after the handwritten graphic objects of FIG. 2A have been recognized by the computer system using the present invention.

FIGS. 2A-3B are illustrations of the electronic tablet 112 of FIG. 1 displaying an output display 200 of a graphics program employing the methods of the present invention. FIG. 2A is an illustration of the output display 200 after the user has drawn by hand graphic objects 201, 202, 203, and 208 with line styles 204, 205, 206, and 209, respectively, onto the tablet 112. The object 201 approximates a circle with a solid line style 204. The object 202 approximates a square with a dotted line style 205. The object 203 approximates a rectangle with a dashed line style 206. The object 208 approximates a horizontal line with a solid line style. FIG. 2B is an illustration of the output display 200 after the computer has recognized the graphic objects 201, 202, 203, and 208 and their line styles 204, 205, 206, and 209. After the objects are recognized, they are displayed with perfected angles and lines. In a preferred embodiment of the present invention, the computer recognizes each object immediately after the object is drawn.

Figure 3A:
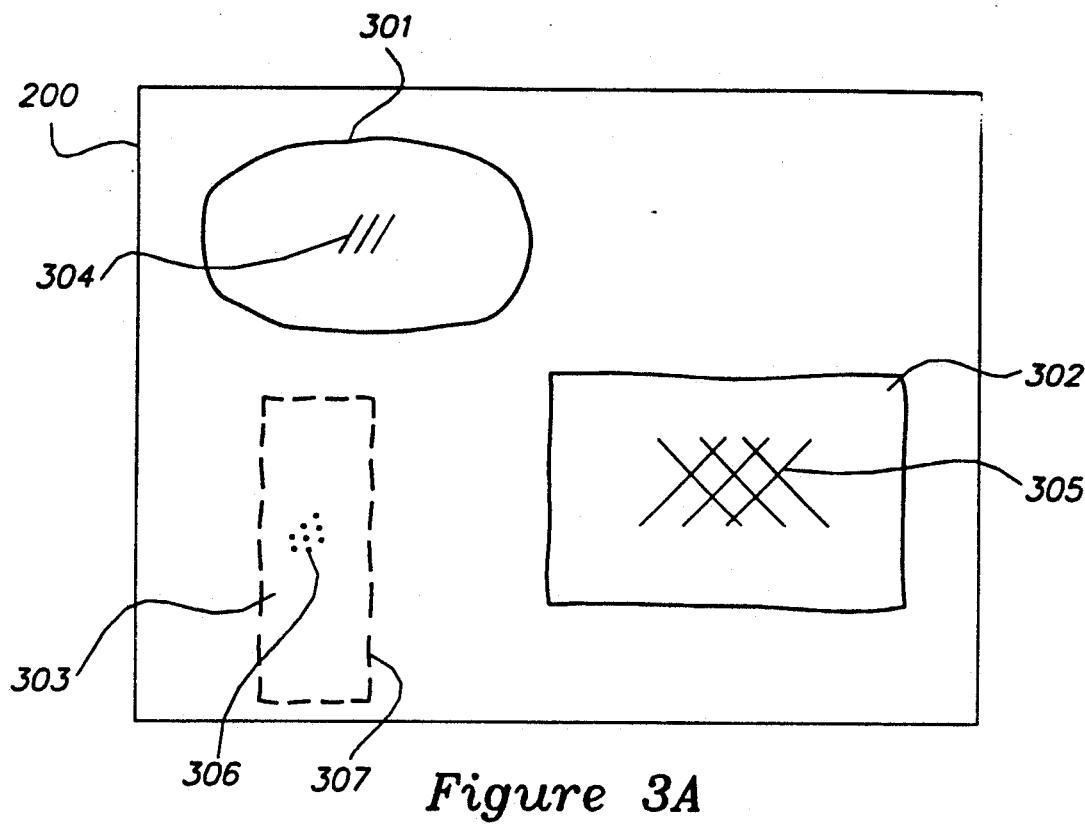
FIG. 3A is an illustration of the electronic tablet of FIG. 1 after the user has handwritten an oval with a solid line style, a rectangle with a solid line style, and a rectangle with a dashed line style, and a gesture representing a fill pattern within each graphic object.
Figure 3B:
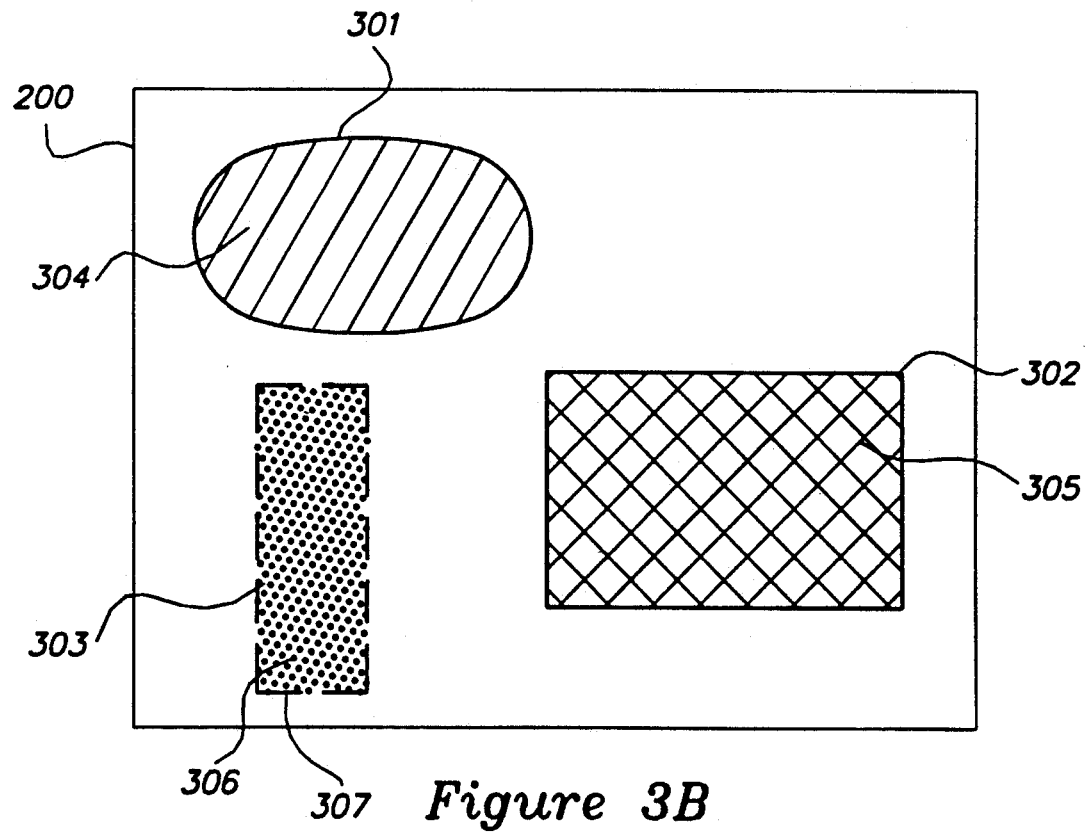
FIG. 3B is an illustration of the electronic tablet of FIG. 1 after the handwritten graphic objects of FIG. 3A have been recognized by the computer system using the present invention.

FIG. 3A is an illustration of the output display 200 after the user has drawn by hand graphic objects 301, 302, and 303 with fill pattern representations 304, 305, and 306, respectively, onto the tablet 112. The object 303 has been drawn with a dashed line style 307. FIG. 3B is an illustration of the output display 200 after the computer has recognized the graphic objects 301, 302, 303, and their fill pattern representations 304, 305, and 306. The computer has changed the fill pattern of each object to match the representation of a fill pattern drawn inside each object. As stated above, in a preferred embodiment of the present invention, the computer recognizes each object immediately after the object is drawn.

In a preferred embodiment, the start of handwriting is detected by the pen 111 contacting the input grid 121 of FIG. 1 (i.e., pen down). The end of handwriting is detected when the pen 111 is not in contact with the input grid 121 (i.e., pen up) for a period of time, which may be predetermined or may vary depending on the pace of user handwriting. Alternately, the start and stop of handwriting can be detected by user selection of a menu item in a graphics program.

The present invention provides a method of recognizing a graphic object as it is drawn by a user. The graphic object is made up of attributes, such as shape, line style, fill pattern, color, etc. The user may draw the object with a solid line style or a line style other than solid. Additionally, the user may draw a representation of a desired fill pattern when the user draws the object. The recognition process is referred to as the Recognizer for ease in explanation. The Recognizer saves the user time in that the user can draw an object with a desired line style and fill pattern instead of having to draw an object, wait for the Recognizer to recognize the object, and then specify a desired line style and fill pattern for the object.

Figure 4:
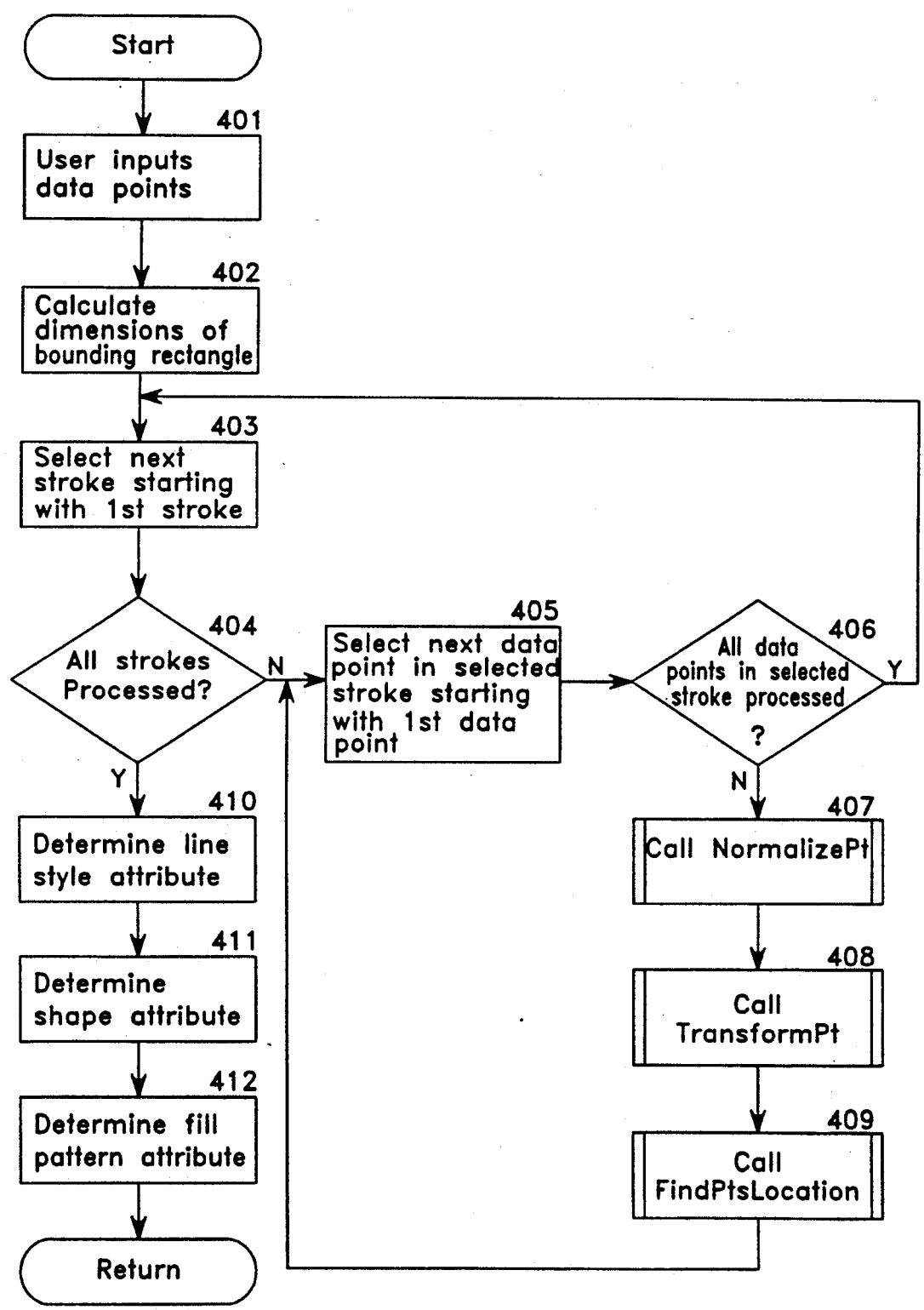
FIG. 4 is an overview flow diagram of a preferred embodiment of a recognition algorithm used by the present invention.

FIG. 4 is an overview flow diagram of a preferred embodiment of a recognition algorithm used by the present invention, while FIGS. 5A-5E comprise a detailed flow diagram. Referring to FIG. 4, the recognition process begins in block 401 where the user inputs data points by drawing a graphic object on the electronic tablet 112 of FIG. 1 with the pen 111. Data points input by the user are referred to as original data points. Original data points are either shape-defining data points or interior-defining data points. In block 402, the Recognizer calculates the dimensions of a bounding rectangle, which is the smallest rectangle that can completely enclose the original data points. The bounding rectangle is not displayed on the tablet 112.

Next, in blocks 403-409, the Recognizer processes each data point in each stroke. A stroke represents all of the data points between a pen down and a pen up and between a pen up and a pen down. In block 403 the Recognizer selects the data points representing a next stroke to be processed, starting with a first stroke. In block 404, the Recognizer determines if all of the strokes have been processed. If they have, the process skips to block 410. If all of the strokes have not been processed, the process continues to block 405 where the Recognizer selects a next data point (in the selected stroke) to be processed, starting with the first data point in the selected stroke. In block 406, the Recognizer determines whether all of the data points in the selected stroke have been processed. If all of the data points in the selected stroke have been processed, the Recognizer loops back to block 403 to select a next stroke.

If all of the data points in the selected stroke have not been processed, the Recognizer processes the selected data point in blocks 407-409. Processing the data point includes calling routines to normalize the data point, transform the normalized data point, then determine whether the transformed data point corresponds to a shape-defining data point or an interior-defining data point. Each of these routines (NormalizePt, TransformPt, and FindPtsLocation) is described in detail below. The Recognizer loops through blocks 405–409 until all of the data points in the selected stroke have been processed. After each data point in each stroke has been processed, in blocks 410–412 the Recognizer determines the line style attribute, shape attribute and fill pattern attribute of the graphic object drawn by the user.

To determine the shape attribute of the graphic object drawn by the user, the Recognizer analyzes the bounding rectangle of the original data points and the coordinates of the transformed data points corresponding to shape-defining data points. In particular, the Recognizer looks at the maximum x-coordinate and maximum y-coordinate and the minimum x-coordinate and minimum y-coordinate of the transformed data points. Based on characteristics of the bounding rectangle and the coordinates of the maximum and minimum transformed data points, the Recognizer determines the shape attribute to be equal to, for example, a vertical, horizontal, or sloped line, an oval, a rectangle, or a scribble. This recognition process is described in more detail below.

To determine the line style attribute of the graphic object drawn by the user, the Recognizer calculates an average number of data points per stroke. Based on the average number of data points per stroke, the Recognizer determines the line style attribute of the object to be equal to, for example, dotted, dashed, or solid. This recognition process is also described in more detail below.

To determine the fill pattern attribute of the graphic object drawn by the user, the Recognizer analyzes the interior-defining data points. Based on the coordinates of the interior-defining data points, the Recognizer determines the fill pattern attribute to be equal to, for example, a cross-hatch pattern, a parallel line pattern, a dotted pattern, or a transparent pattern.

Normalizing a Data Point. In this context, normalizing a data point means scaling the data point to fit into an arbitrary range of values. In a preferred embodiment, the routine NormalizePt maps an original data point to a 2000×2000 square centered over the origin of the x-y axis. The corner coordinates of this square are (−1000, 1000), (1000, 1000), (1000, −1000), and (−1000, −1000). After all of the original data points are normalized, the original data point that has the smallest x-coordinate is mapped to a normalized x-coordinate of −1000, while the original data point that has the greatest x-coordinate is mapped to a normalized x-coordinate of 1000.

Figure 6:
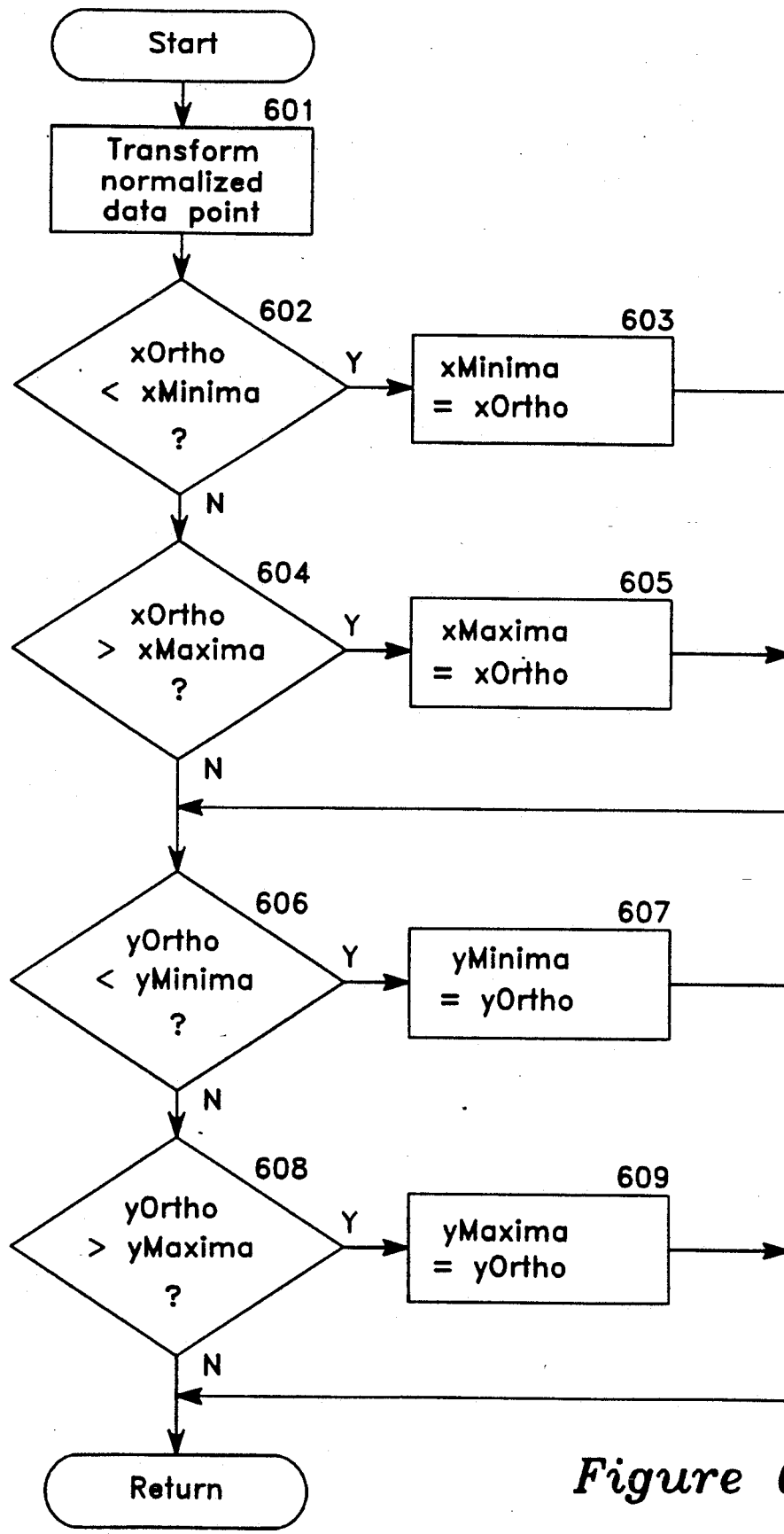
FIG. 6 is a detailed flow diagram of the routine TransformPt of the present invention.

Transforming a Data Point. FIG. 6 is a detailed flow diagram of a routine TransformPt used to transform a data point. The inputs to this routine are given in coordinates normalized within the space (−1000, −1000) to (1000,1000). The routine begins in block 601 where the Recognizer transforms a normalized data point by performing the following calculations:

$$xOrtho = pt.x + pt.y$$

$$yOrtho = pt.x - pt.y$$

The transform rotates the point by some multiple of 90 degrees, plus or minus 45 degrees, the multiple depending on which quadrant the normalized data point is in. The routine TransformPt also keeps track of a minimum and a maximum value for each of the x- and y-coordinates of the transformed data points (xOrtho and yOrtho). These values--xMaxima, yMaxima, xMinima, and yMinima--are initially set to zero.

In block 602, the Recognizer determines whether xOrtho is less than xMinima. If so, in block 603 the Recognizer sets xMinima equal to xOrtho. If not, in block 604 the Recognizer determines whether xOrtho is greater than xMaxima. If so, in block 605 the Recognizer sets xMaxima equal to xOrtho. The routine continues on to block 606 where the Recognizer determines if yOrtho is less than yMinima. If so, in block 607 the Recognizer sets yMinima equal to yOrtho. If not, in block 608, the Recognizer determines whether yOrtho is greater than yMaxima. If so, in block 609 the Recognizer sets yMaxima equal to yOrtho. Each time the routine TransformPt is called, the x- and y-coordinates of minima and maxima are compared to the x- and y-coordinates of the transformed data point.

Figure 7:
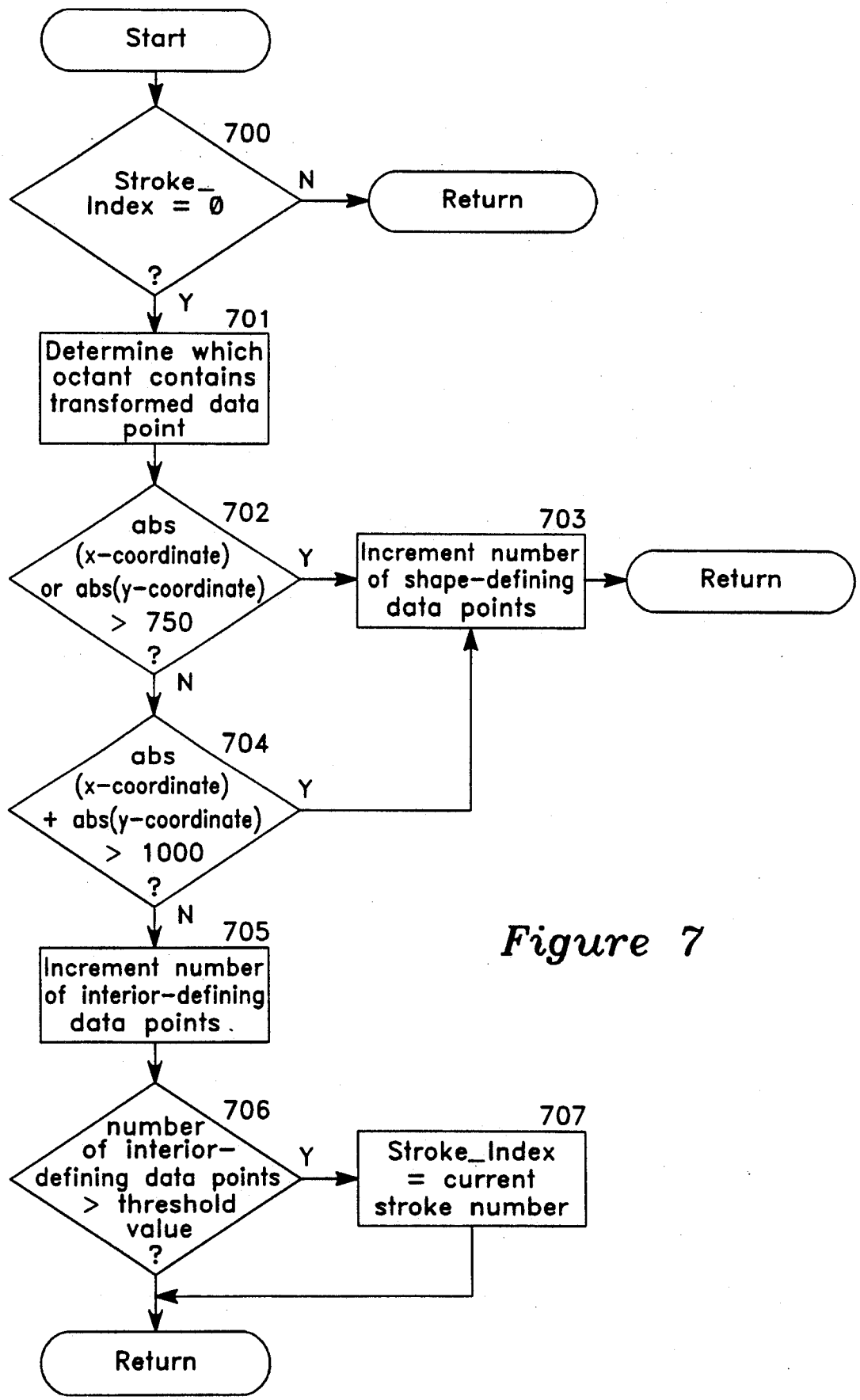
FIG. 7 is a detailed flow diagram of the routine FindPtsLocation of the present invention.

Finding a point's location. FIG. 7 illustrates a detailed flow diagram of a routine FindPtsLocation used to find a transformed data point's location in relation to other transformed data points. A single transformed data point is passed to this routine.

The routine FindPtsLocation determines the octant in which a transformed data point is located, and whether the data point is a shape-defining data point or an interior-defining data point. The routine keeps track of the total number of shape-defining data points and interior-defining data points. The process begins with block 700 where the Recognizer checks the value of the variable Stroke$_{13}$Index. This variable remembers the index number of the stroke currently being processed when the number of interior-defining data points reaches a predefined amount. In a preferred embodiment, the predefined amount is dependent on the sampling rate of the tablet 112. At 100 data points per second, the predefined amount in a preferred embodiment is 25, i.e., ¼ second worth of data points. If Stroke__Index is not equal to zero, the Recognizer exits the routine FindPtsLocation without determining whether the data point is interior-defining or shape-defining. If Stroke__Index is equal to zero, then in block 701 the Recognizer determines the octant in which the data point is located. In a preferred embodiment, a variable is used to keep track of which octants contain data points. Because there are eight octants, the variable has eight bits. The Recognizer sets a bit of the variable corresponding to an octant when a data point is found to lie in that octant.

Figure 8:
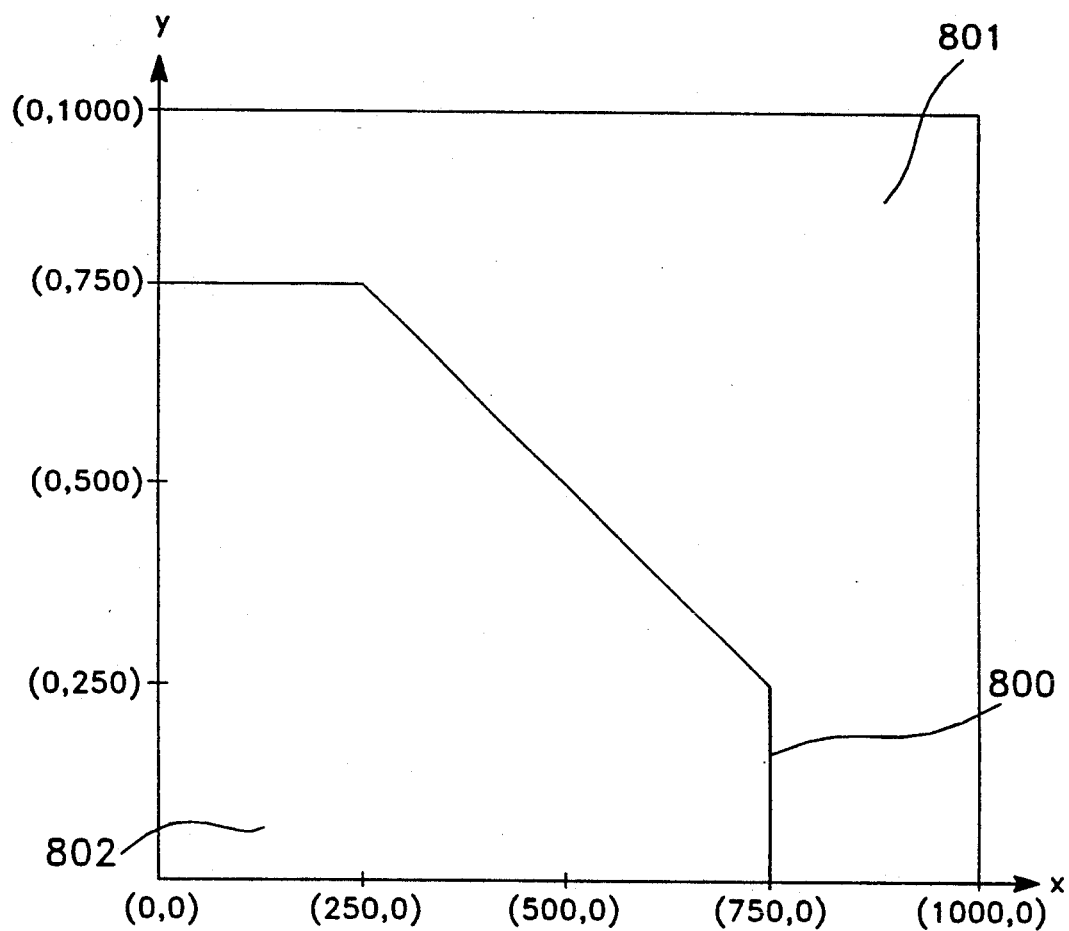
FIG. 8 is a diagram used in a preferred embodiment of the present invention to identify shape-defining points and interior-defining points.

After the Recognizer determines in which octant the data point lies, the Recognizer determines whether the data point is a shape-defining data point or an interior-defining data point. FIG. 8 is a schematic drawing of a template used in a preferred embodiment of the present invention to determine whether a data point is a shape-defining data point or an interior-defining data point. The template represents quadrant one of the x-y coordinate plane. Before determining if a data point is a shape-defining data point or an interior-defining data point, the Recognizer maps the data point to quadrant one by taking the absolute value of the data point's x-coordinate and y-coordinate. This mapping is done to simplify calculations. Depending on where the mapped data point lies in the first quadrant, the Recognizer considers the data point to be either a shape-defining data point or an interior-defining data point.

Referring to FIG. 8, data points that lie within are 801 are considered to be shape-defining data points, while data points that lie within area 802 are considered to be interior-defining data points. Line 800 separates area 801 from area 802. Area 802 represents an area in quadrant one bounded by the lines $X=750$, $Y=750$, and $X+Y=1000$. Line 800 is a linear approximation of a circle. Area 802 is bounded by line 800 object and the lines $x=1000$ and $y=1000$. If performance were not an issue, the Recognizer would determine whether the square root of the sum of the squares of the x-coordinate and the y-coordinate is less than 750. That is, line 800 would represent a segment of a circle having a radius of 750. Rather than using a square-root, a linear approximation is used instead.

Referring back to FIG. 7, in block 702 the Recognizer determines whether the x-coordinate or the y-coordinate of the mapped data point is larger than 750. If the x-coordinate or the y-coordinate of the mapped data point is larger than 750, then the Recognizer considers the data point to be a shape-defining data point and in block 703, the Recognizer increments a variable representing the number of shape-defining data points.

If the x-coordinate or the y-coordinate of the mapped data point is less than or equal to 750, then the Recognizer determines in block 704 if the sum of the x-coordinate and the y-coordinate is greater than 1000. If the sum of the x-coordinate and the y-coordinate is greater than 1000, then the Recognizer considers the data point to be a shape-defining data point and in block 703, the Recognizer increments a variable representing the number of shape-defining data points.

The Recognizer considers the data point to be interior-defining when the x-coordinate and the y-coordinate is less than or equal to 750 and the sum of the two coordinates is less than or equal to 1000. When the Recognizer determines the data point to be an interior-defining data point, in block 705 the Recognizer increments a variable representing the number of interior-defining data points. Interior-defining data points will be recognized into a fill pattern as described below.

In block 706, the Recognizer determines whether the number of counted interior-defining data points has reached a predefined threshold value. If so, in block 707 the variable Stroke_Index is set to the index number of the stroke currently being processed. The variable Stroke_Index is checked at the beginning of the routine FindPtsLocation in block 700.

Figure 5A:
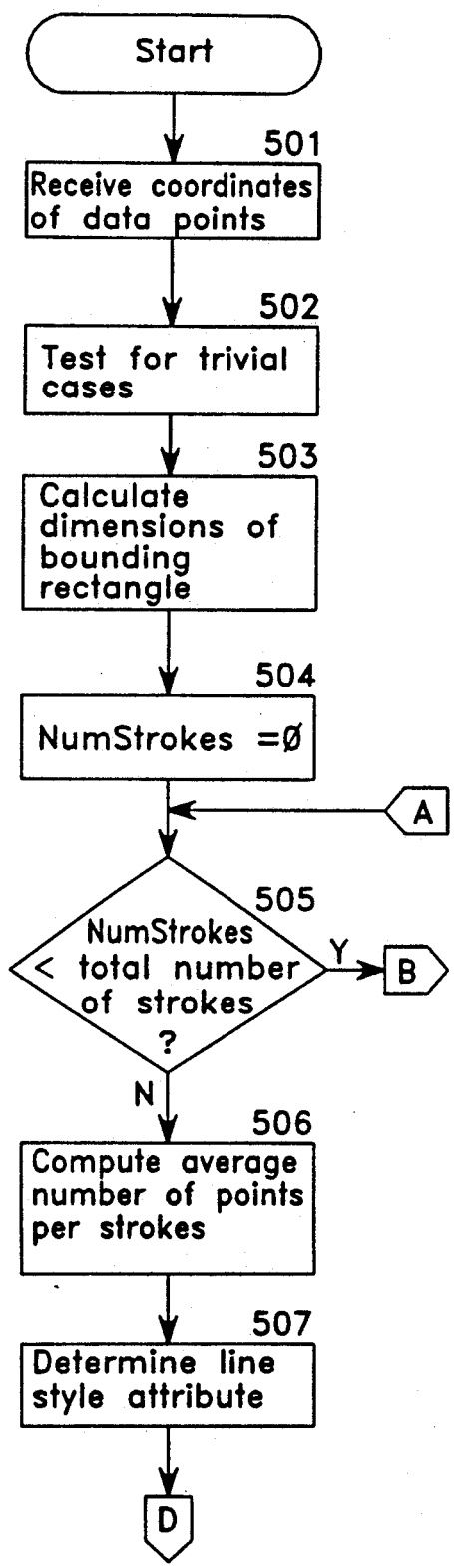
FIGS. 5A-5E comprise a detailed flow diagram of a preferred embodiment of the recognition algorithm used by the present invention.

Recognizing a Graphic Object. FIGS. 5A-5E comprise a detailed flow diagram of the recognition algorithm described above in reference to FIG. 4. Referring to FIG. 5A, in block 501 the Recognizer receives the coordinates of all of the original data points from the tablet 112. In block 502, the Recognizer tests for trivial cases, such as when the user inputs only one data point. To save time, the Recognizer recognizes the single data point into a scribble and with a solid line style at this beginning stage of the recognition process. Other trivial test cases could easily be inserted at this stage of the process.

In block 503, the Recognizer calculates the dimensions of a bounding rectangle, which is the smallest rectangle that can completely enclose the original data points. The bounding rectangle is not displayed on the tablet 112. In block 504, the Recognizer initializes to zero a counter variable representing the number of strokes processed so far. In block 505, the Recognizer determines whether all of the strokes have been processed. If all of the strokes have not been processed, the Recognizer skips to block 520 in FIG. 5B.

Figure 5B:
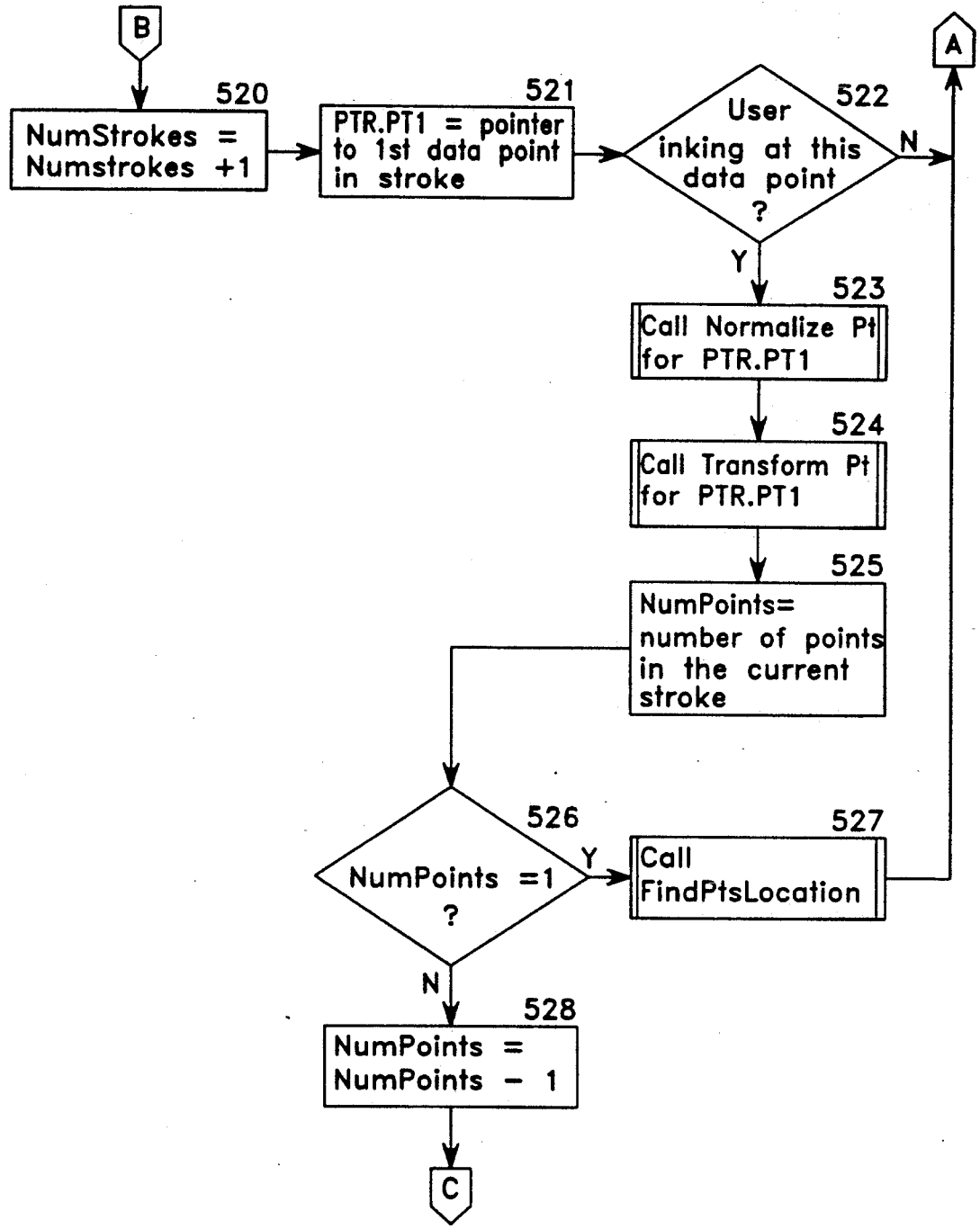

Referring to FIG. 5B, in block 520, the Recognizer increments the counter variable representing the number of strokes. In block 521, the Recognizer sets a pointer to point to the first data point of the current stroke. Next, in block 522, the Recognizer determines whether the data point represents the pen 111 touching the tablet 112. The Recognizer is only concerned with data points that represent the pen 111 touching the tablet 112. That is, the Recognizer is not concerned with data points that track pen movement while the pen is not touching the tablet. If the pen was not touching the tablet, the Recognizer is not concerned with the current stroke, so the process loops back to block 505 of FIG. 5A to start the process over using the next stroke. If the data point represents the pen touching the tablet, the process continues on to block 523 where the Recognizer calls the routine NormalizePt to normalize the first data point. The routine NormalizePt is described in detail above.

After the first data point is normalized, in block 524 the Recognizer calls the routine TransformPt to transform the normalized data point. The routine TransformPt is described in detail above. In block 525, the Recognizer initializes a variable NumPoints to be equal to the number of data points in the current stroke. In block 526, the Recognizer determines whether the current stroke is made up of only one data point by checking the value of the variable NumPoints. If the current stroke is made up of only one data point, the Recognizer calls the routine FindPtsLocation in block 527 to determine the data point's location in relation to other data points. If the current stroke is made up of more than one data point, then in block 528 the Recognizer decrements the variable NumPoints. The process continues at block 530 in FIG. 5C.

Figure 5C:
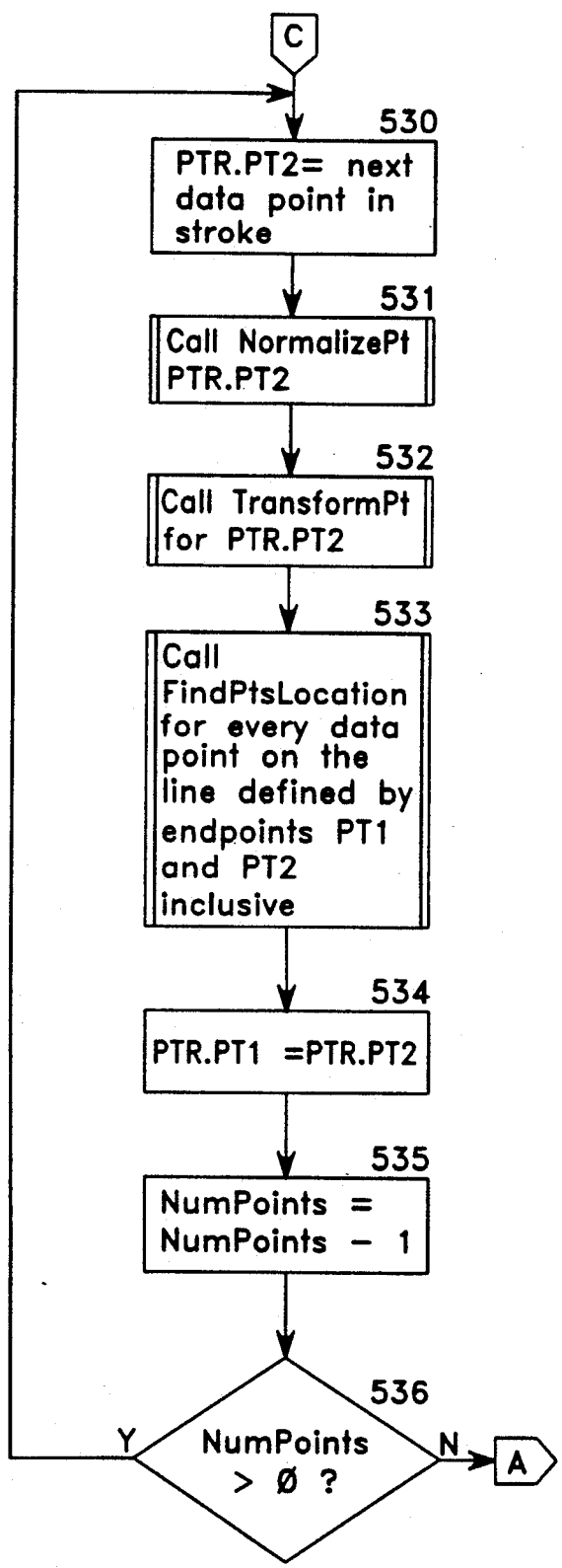
Figure 5D:
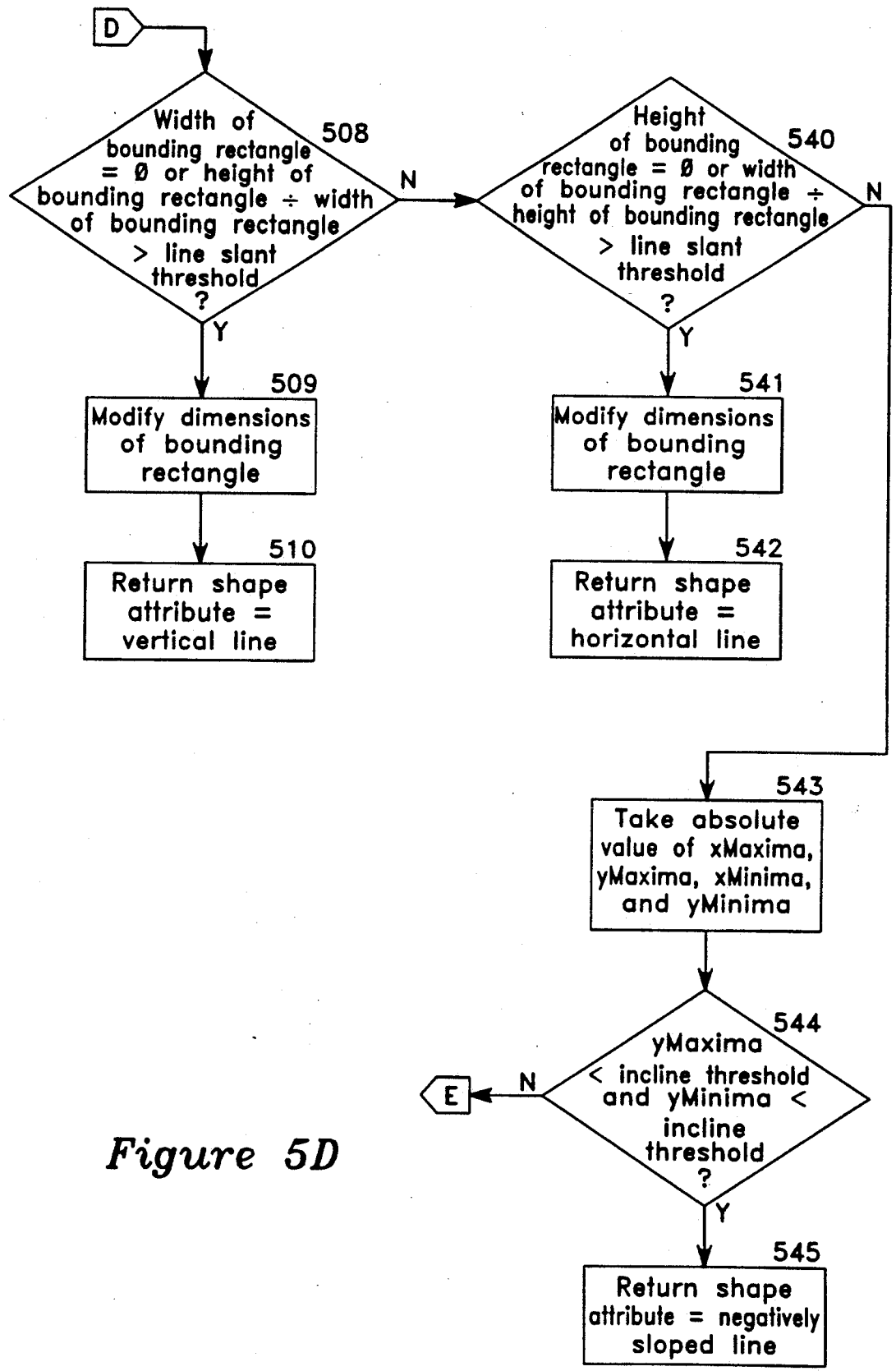
Figure 5E:
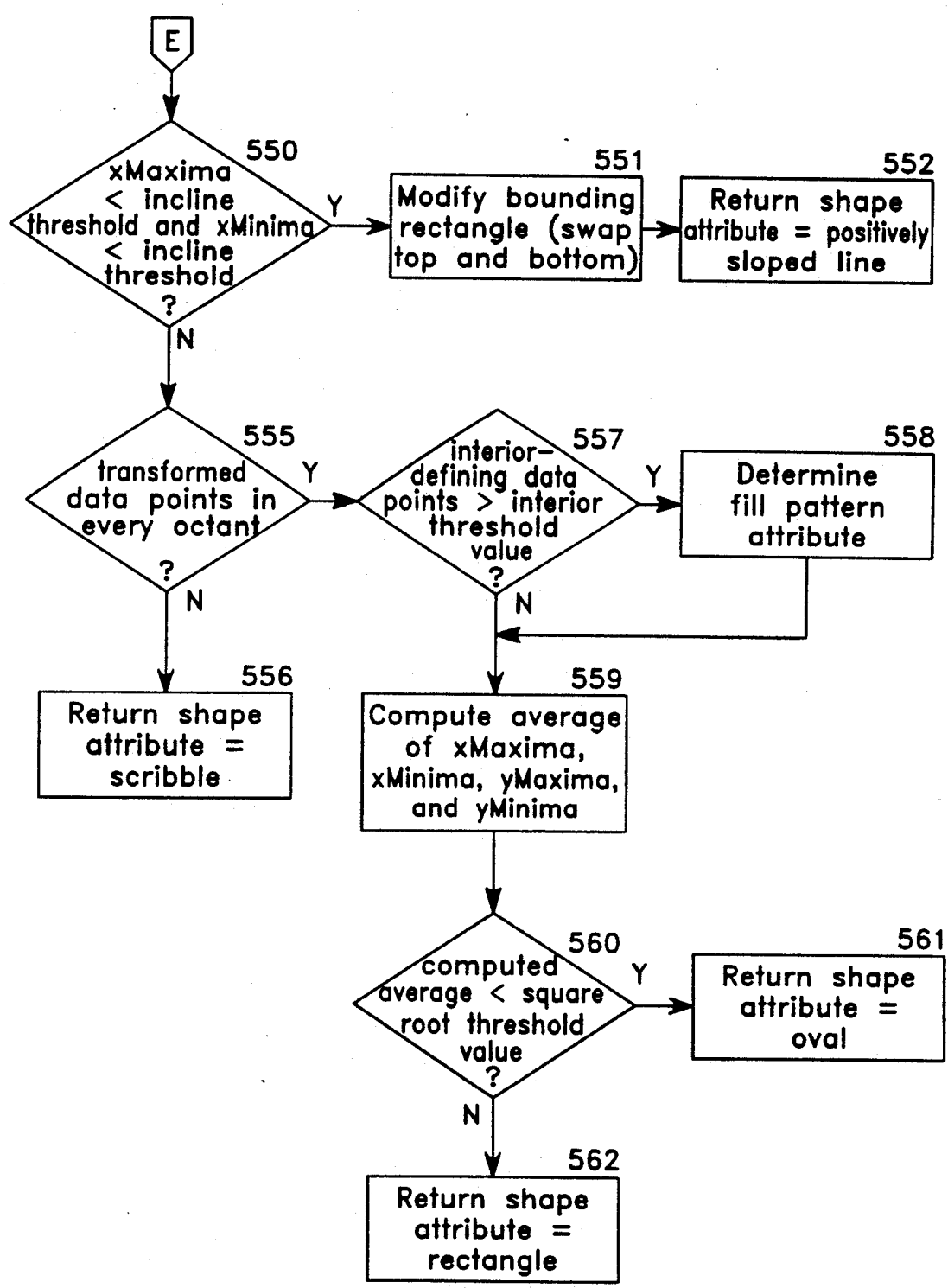

In block 530 of FIG. 5C, the Recognizer increments the pointer to point to a second data point in the current stroke. In block 531, the Recognizer calls the routine NormalizePt to normalize the second data point. Next, in block 532, the Recognizer calls the routine TransformPt to transform the normalized second data point. After the second data point has been normalized and transformed, in block 533, the Recognizer calls the routine FindPtsLocation for every point on the line defined by the endpoints PT1 and PT2 inclusive. The process continues on to block 534 where the Recognizer sets the pointer that was pointing to the first data point equal to the second data point. Now when the process loops back to identify the next pair of data points in the current stroke, the first data point of the next pair of points will be the second data point of the previous pair of points.

Next, in block 535, the Recognizer decrements the variable NumPoints, representing the number of data points in the current stroke, by one. This variable is decremented each time through the loop represented by blocks 530-536. After the NumPoints is decremented, in block 536 the Recognizer determines if NumPoints is greater than zero. If so, all of the data points in the current stroke have not been processed, so the Recognizer loops back to block 530. If NumPoints is equal to zero, all of the data points in the current stroke have been processed so the Recognizer loops back to block 505 in FIG. 5A to determine if all of the strokes that make up the object have been processed.

Referring back to block 505 of FIG. 5A, if all of the strokes that make up the object have been processed, the Recognizer computes the average number of data points per stroke in block 506. Based on the average number of data points per stroke, the Recognizer determines the line style in block 507. A threshold value for each line style is compared to the average number of data points per stroke. The threshold values depend upon the sampling rate of the tablet 112.

For example, in a preferred embodiment, if the average number of data points per stroke is less than or equal to 136, then the Recognizer recognizes the line style is made up of dots; if the average number of data points per stroke is greater than 136 but less than or equal to 512, then the Recognizer recognizes the line style is made up of dashes. If the average number of data points per stroke is greater than 512, the Recognizer recognizes the line style to be solid. After the Recognizer has determined the line style of the object based on the average number of data points per stroke, the process continues on to block 508 of FIG. 5D.

In block 508, the Recognizer determines whether the width of the bounding rectangle is equal to zero or whether the height of the bounding rectangle divided by the width of the bounding rectangle is greater than a line slant value. In a preferred embodiment, the line slant value is 20. If either of the logical expressions checked in block 508 are true, the Recognizer modifies the bounding rectangle in block 509 by setting the leftmost and rightmost coordinates of the bounding rectangle equal to the average of the leftmost and rightmost coordinates. After the bounding rectangle is modified, the process ends with block 510 when the Recognizer recognizes the shape attribute to be a vertical line.

If both of the logical expressions checked in block 508 are not true, in block 540 the Recognizer determines whether the height of the bounding rectangle is equal to zero or whether the width of the bounding rectangle divided by the height of the bounding rectangle is greater than the line slant value. If either of the logical expressions checked in block 540 are true, the Recognizer modifies the bounding rectangle in block 541 by setting the topmost and bottommost coordinates of the bounding rectangle equal to the average of the topmost and bottommost coordinates. The process ends in block 542 where the Recognizer recognizes the shape attribute to be a horizontal line.

If both of the logical expressions checked in block 540 are not true, in block 543 the Recognizer takes the absolute value of the x-coordinate and the y-coordinate of the maxima and minima values. The maxima and minima values were calculated in the routine TransformPt. In block 544, the Recognizer determines whether the y-coordinates of the maxima and minima values are both less than an incline threshold value. In a preferred embodiment, this threshold value is 500. This determination checks to see if both points are within some small amount of the origin. If both of the logical expressions checked in block 544 are true, then the original data points are sufficiently colinear for them to be deemed a line. The process ends with block 545 where the Recognizer recognizes the shape attribute to be a negatively sloped line. If both of the logical expressions checked in block 544 are not true, the process skips to block 550 of FIG. 5E.

In block 550, the Recognizer determines whether the x-coordinates of the maxima and minima values are both less than the above described incline threshold value. This determination checks to see if both values are within some small amount of the origin. If both of the logical expressions checked in block 550 are true, then the original data points are sufficiently colinear for them to be deemed a line. In block 551, the Recognizer modifies the bounding rectangle of the original data points by swapping the top and bottom coordinates of the rectangle. After the bounding rectangle is modified, the process ends with block 552 when the Recognizer recognizes the shape attribute to be a positively sloped line. If either of the logical expressions checked in block 550 are not true, the process skips to block 555.

In block 555, the process determines whether all of the octants in the x-y plane contain data points. The Recognizer previously determined the location of every transformed data point in the routine FindPtsLocation, which is illustrated in FIG. 7. If all of the octants contain data points, the process continues on to block 557 where the Recognizer determines whether there is a sufficient number of interior-defining data points to define a fill pattern. This number is arbitrary, and it depends upon what types of fill pattern the Recognizer will recognize. If there is a sufficient number of interior-defining data points, in block 558 the Recognizer determines the fill pattern attribute.

In the preferred embodiment, a gesture can be recognized into a fill pattern or line style using many different techniques. One such technique for recognizing a gesture into a fill pattern assumes that all inking done between each pen down and pen up are either taps or strokes. If the gesture does not contain any strokes, the system selects a fill pattern consisting of a gray pattern with a density based on the density of the taps. If the gesture is made up of mixed taps and strokes, then the system assumes a fill pattern is not being defined and leaves the gesture as it is drawn. The user may then invoke the custom fill pattern routine. Each stroke is then perfected, i.e., turned into a straight line. The perfected strokes are aligned to the four primary and four secondary compass points. If a stroke does not closely enough correspond to such a line, then the system assumes the gesture is not a fill pattern. If the strokes have more than two orientations, or if the orientations are not at right angles to each other, the system assumes the gesture is not a fill pattern. Otherwise, the system assumes the fill pattern is a cross-hatch fill, either orthogonal or diagonal.

If, in block 557, there is an insufficient number of interior-defining data points, the Recognizer determines the fill pattern attribute to be equal to a transparent fill pattern. In block 559, the Recognizer computes the average of the x-coordinate and the y-coordinate of the maxima and minima values. In block 560 the Recognizer determines whether this average is less than a square root value. In a preferred embodiment, the square root value is chosen to be approximately 1414. This number is chosen because the routine TransformPt expands the normalized data points by a factor of approximately 1414 (the square root of 2, multiplied by 1000). To compensate for this expansion, the Recognizer takes the average distance from the origin to the maxima and minima values, and determines if the average value is greater than the square root of 2. If the value is greater than the square root of 2, the shape that comprises the transformed data points has square corners. If the value is less than the square root of 2, the shape has rounded corners.

If the average is less than the predetermined threshold value, the process ends with block 561 when the Recognizer recognizes the shape attribute to be an oval. If the average is equal to or greater than a predetermined threshold value, the process ends with block 562 when the Recognizer recognizes the shape attribute to be a rectangle. If the Recognizer determines in block 555 that all of the octants do not contain data points, the process ends with block 556 when the Recognizer recognizes the shape attribute to be a scribble. The scribble is treated as a default, such that an object is recognized as a scribble only when the Recognizer cannot recognize the data points into a known graphic object. A person having ordinary skill in the art will recognize that additional attributes of graphic objects can be recognized by making minor modifications to this algorithm.

A method of recognizing handwritten graphic objects has been described. While most of the examples given are for graphic objects as they are written on an electronic tablet, the principles may be applied to aid in recognition of a graphic object scanned by an optical scanner reader, after it is written. All that is necessary is for the data to be presented in an X-Y coordinate form. This data may be obtained by plotting or tracing over a graphic object after it is written, that being equivalent to receiving data input from the path traveled by a writing instrument while the graphic object is being written.

It will be apparent that many variations of the principles taught herein are equivalent and fall within this invention, as defined by the claims. The invention is not limited to the embodiments and combinations described herein, and one part of the invention could be combined with another system.

I claim:

1. A method of recognizing a graphic object in a computer system, the computer system comprising a handwriting instrument and an electronic tablet, the graphic object comprising a shape attribute, a line style attribute, and a fill pattern attribute, the method comprising the steps of:

drawing the graphic object on the electronic tablet with the handwriting instrument to produce a plurality of data points, the data points comprising shape-defining data points and interior-defining data points, the shape-defining data points representative of the shape attribute and the line style attribute and the interior-defining data points representative of the fill pattern attribute, each data point having an x-coordinate and a y-coordinate;

segmenting the plurality of data points into one or more strokes, wherein each stroke comprises one or more data points in a path traveled by the handwriting instrument after the handwriting instrument touches the electronic tablet and before the handwriting instrument is lifted off of the electronic tablet, the strokes comprising shape-defining strokes and interior-defining strokes, each shape-defining stroke having only shape-defining data points and each interior-stroke having only interior-defining data points;

for selected ones of the data points mapping the data point to a normalized data point, the normalized data point having an x-coordinate and a y-coordinate that are within a predetermined range of values; and transforming the normalized data point into a transformed data point by rotating the normalized data point a preselected angle;

determining an average number of data points per stroke;

based on the average number of data points per stroke, determining the line style attribute of the graphic object;

based on the largest and smallest x-coordinate of the data points, the largest and smallest y-coordinate of the data points, the largest and smallest x-coordinate of the transformed data points, and the largest and smallest y-coordinate of the transformed data points, determining the shape attribute of the graphic object;

based on the largest and the smallest y-coordinate of the transformed data points, determining the slope of the shape attribute of the graphic object when the shape attribute is determined to be equal to a line;

based on the x-coordinate and y-coordinate of the interior-defining data points, determining the fill pattern attribute of the graphic object; and selecting a representation of the graphic object corresponding to the determined line style attribute, the determined shape attribute, and the determined format attribute.

2. The method of claim 1 wherein the step of transforming the normalized data point into a transformed data point by rotating the normalized data point includes the steps of:

setting the x-coordinate of the transformed data point equal to the x-coordinate of the normalized data point plus the y-coordinate of the normalized data point; and setting the y-coordinate of the transformed data point equal to the x-coordinate of the normalized data point minus the y-coordinate of the normalized data point.

3. The method of claim 1 wherein the step of transforming the normalized data point into a transformed data point includes the steps of:

after transforming the normalized data point, determining whether the transformed data point corresponds to a shape-defining data point or an interior-defining data point;

incrementing a value representative of the total number of interior-defining data points when the transformed data point is determined to be an interior-defining data point; and incrementing a value representative of the total number of shape-defining data points when the transformed data point is determined to be a shape-defining data point.

4. The method of claim 3 wherein the step of determining whether the transformed data point corresponds to a shape-defining data point or an interior defining data point includes the steps of:

mapping the transformed data point to the first quadrant of the x-y coordinate plane;

when the x-coordinate or the y-coordinate of the mapped data point is greater than a first border threshold value, determining the transformed data point to be a shape-defining point;

when the sum of the x-coordinate of the mapped data point and the y-coordinate of the mapped data point is greater than a second border threshold, determining the transformed data point to be a shape-defining point; and when the x-coordinate or the y-coordinate of the mapped data point is less than or equal to the first border threshold value and the sum of the x-coordinate of the mapped data point added to the y-coordinate of the mapped data point is less than or equal to the second border threshold, determining the transformed data point to be an interior-defining point.

5. The method of claim 4 wherein the first border threshold and the second border threshold represent a linear approximation of a circular line.

6. The method of claim 3 wherein the step of determining an average number of data points per stroke includes dividing the total number of shape-defining data points by the total number of strokes that contain shape-defining data points.

7. The method of claim 1 including, subsequent to the step of transforming the normalized data point into a transformed data point, the step of determining which octant of the x-y coordinate plane contains the transformed data point.

8. The method of claim 1 wherein the predetermined range of values is equal to −1000 to 1000.

9. The method of claim 1 wherein the step of determining the line style attribute of the graphic object includes determining the line style attribute of the graphic object to be equal to a dotted line style when the average number of data points per stroke is less than or equal to a predetermined value.

10. The method of claim 9 wherein the predetermined value is equal to 136.

11. The method of claim 1 wherein the step of determining the line style attribute of the graphic object includes determining the line style attribute of the graphic object to be equal to a dashed line style when the average number of data points per stroke is greater than a first predetermined value and less than or equal to a second predetermined value.

12. The method of claim 11 wherein the first predetermined value is equal to 136 and the second predetermined value is equal to 512.

13. The method of claim 1 wherein the step of determining the line style attribute of the graphic object includes determining the line style attribute of the graphic object to be equal to a solid line style when the average number of data points per stroke is greater than a second predetermined value.

14. The method of claim 13 wherein the second predetermined value is equal to 512.

15. The method of claim 1 wherein the step of determining the shape attribute of the graphic object includes the steps of:

when the largest x-coordinate is substantially equal to the smallest x-coordinate, determining the shape of the graphic object to be equal to a vertical line; and when the distance between the largest y-coordinate and the smallest y-coordinate, divided by the distance between the largest x-coordinate and the smallest x-coordinate, is greater than a line slant threshold value, determining the shape of the graphic object to be equal to a vertical line.

16. The method of claim 1 wherein the step of determining the shape attribute of the graphic object includes the steps of:

comparing the largest of y-coordinate to the smallest coordinate;

when the largest y-coordinate is equal to the smallest y-coordinate, determining the shape of the graphic object to be equal to a horizontal line;

subtracting the smallest x-coordinate from the largest x-coordinate; and when the distance between the largest x-coordinate and the smallest x-coordinate, divided by the distance between the largest y-coordinate and the smallest y-coordinate, is greater than the line slant threshold value, determining the shape of the graphic object to be equal to a horizontal line.

17. The method of claim 1 wherein the step of determining the shape attribute of the graphic object includes determining the shape attribute of the graphic object to be equal to a negatively sloped line when the largest x-coordinate is not equal to the smallest x-coordinate and the largest y-coordinate is not equal to the smallest y-coordinate and the absolute value of both the largest and the smallest y-coordinates of the transformed data points are less than an incline threshold value.

18. The method of claim 1 wherein the step of determining the shape attribute of the graphic object includes determining the shape attribute of the graphic object to be equal to a positively sloped line when the largest x-coordinate is not equal to the smallest x-coordinate, the largest y-coordinate is not equal to the smallest y-coordinate, the absolute value of either the largest or the smallest y-coordinate of the transformed data points is greater than or equal to an incline threshold value, and the absolute value of both the largest and the smallest x-coordinates of the transformed data points are less than the incline threshold value.

19. The method of claim 1 wherein the step of determining the shape attribute of the graphic object includes determining the shape attribute of the graphic object to be equal to a scribble when the largest x-coordinate is not equal to the smallest x-coordinate, the largest y-coordinate is not equal to the smallest y-coordinate, the absolute value of either the largest or the smallest y-coordinate of the transformed data points is greater than or equal to an incline threshold value, and the absolute value of either the largest or the smallest x-coordinate of the transformed data points is greater than or equal to the incline threshold value.

20. The method of claim 1 wherein the step of determining the fill pattern attribute of the graphic object includes determining the fill pattern attribute to be equal to a transparent fill pattern when the number total number of inter-defining points is less than or equal to an interior threshold value.

* * * * *

UNITED STATES PATENT AND TRADEMARK OFFICE
CERTIFICATE OF CORRECTION

PATENT NO.   :   5,287,417
DATED        :   February 15, 1994
INVENTOR(S)  :   Martin Eller et al.

It is certified that error appears in the above-identified patent and that said Letters Patent is hereby corrected as shown below:

In column 14, claim 20, line 58, please delete "inter-defining" and substitute therefor --interior-defining--.

Signed and Sealed this

Ninth Day of August, 1994

BRUCE LEHMAN

Attest:

Attesting Officer

Commissioner of Patents and Trademarks